Jan. 12, 1926.
J. E. LONG
1,569,329
AUTOMATIC RETAINING VALVE
Filed July 23, 1923
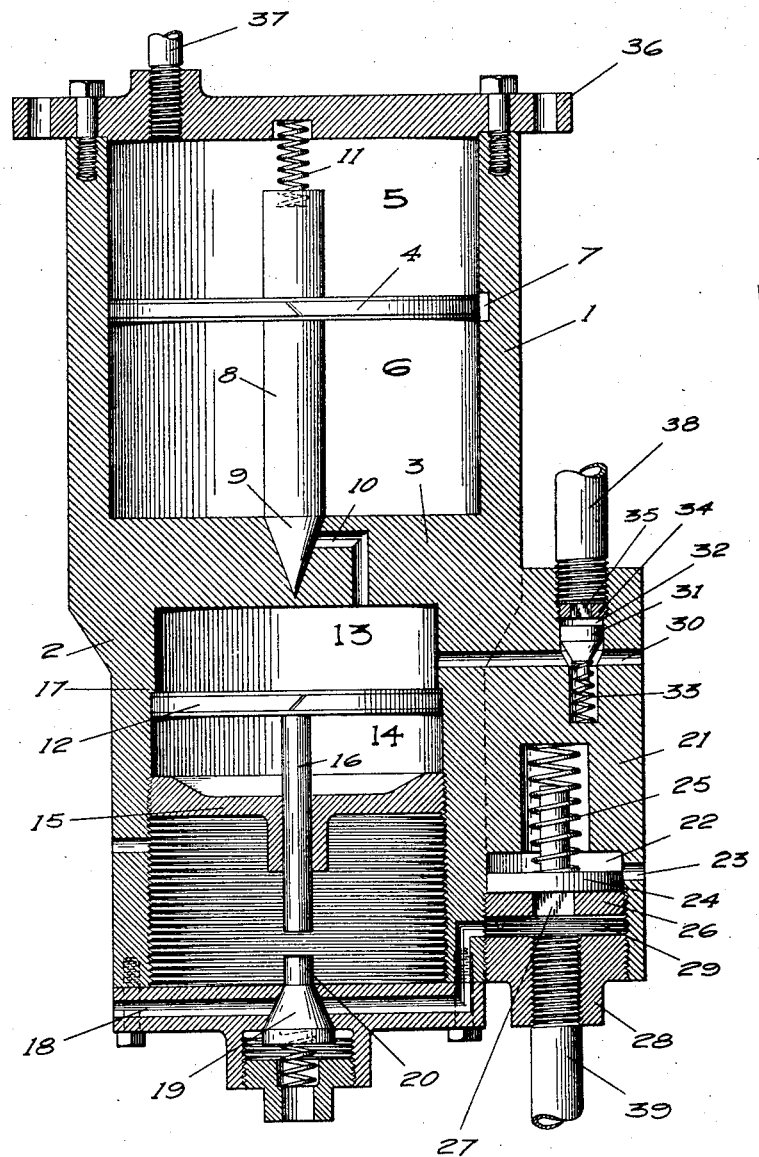
INVENTOR.
John E. Long
BY
ATTORNEY Patented Jan. 12, 1926.

1,569,329

UNITED STATES PATENT OFFICE.

JOHN E. LONG, OF MARYSVILLE, CALIFORNIA, ASSIGNOR OF ONE-THIRD TO I. H. CAPLAN AND ONE-THIRD TO SAMUEL CAPLAN, BOTH OF FRESNO, CALIFORNIA.

AUTOMATIC RETAINING VALVE.

Application filed July 23, 1923. Serial No. 653,153.

*To all whom it may concern:*

Be it known that I, JOHN E. LONG, a citizen of the United States, residing at Marysville, county of Yuba, State of California, have invented certain new and useful Improvements in Automatic Retaining Valves; and I do declare the following to be a full, clear, and exact description of the same, reference being had to the accompanying drawings, and to the characters of reference marked thereon, which form a part of this application.

This invention relates to the train air brake art and particularly the brake pressure retaining means used in maintaining brake pressure in the brake cylinders when descending long or frequent grades. In most forms of retaining valves now commonly used the valve is located at one end or side of the car and connected up with the exhaust pipe. The functioning of the valve is manually controlled by a lever valve which must be closed when the valves are to be used and opened when not to be used. This of course is a more or less unsatisfactory equipment as the trainman's time is consumed in attending the valves and also if he overlooks or forgets to open the valves when necessary this often results in burnt brakes and flat wheels.

The object of my invention is to provide an automatic retaining valve controllable by the operation of the engineer's valve. The many advantages to be derived from such an equipment will be specifically pointed out after the following detailed description of the invention.

The figure of the drawings is a vertical cross section of my improved automatic retaining valve.

Referring now more particularly to the characters of reference on the drawings the main casing of the valve is divided into two cylinders 1 and 2 by a partition wall 3. The cylinder 2 is of slightly less diameter than the cylinder 1. In the cylinder 1 is a piston 4 forming on each side thereof chambers 5 and 6 respectively. When the piston 4 is in normal position, as shown in the drawing, a bleed groove 7 provides communication between the chambers 5 and 6.

On the piston 4 is a stem 8 terminating at one end in a taper 9 forming the valve for a port 10 leading from the chamber 6 into a chamber 13 in the cylinder 2, as will be hereinafter described.

This valve 9 is normally held seated by a spring 11 interposed between the opposite end of the stem 8 and the end of the cylinder 2.

Within the cylinder 2 is a piston 12 dividing the said cylinder 2 into two chambers 13 and 14. A guide 15 is threaded into the cylinder 2, while 16 is a stem on the piston 12 movable through said guide. A shoulder 17 limits the movement of the piston 12 in the direction of the port 10 so that free communication will at all times be open between the port 10, chamber 13 and a port 30 leading to the atmosphere.

Formed through one end of the cylinder 2 is a release port 18 normally closed by a spring pressed check valve 19 having a stem 20 projecting into the chamber 14 in alinement with the stem 16, whereby the valve 19 may be opened with the movement of the piston 12.

An enlargement 21 on the side of the cylinder 2 is provided with a bore 22 having a bleed port 23 near its inner end normally closed by a plunger 24 movable in the bore 22 and held to normal position by a spring 25. The tension of the spring 25 is controlled by an adjusting nut 26 threaded into the bore 22 against the plunger 24. A square hole 27 in the nut 26 provides a seat for a wrench and also acts as a port as will presently appear.

A nipple 28 is threaded into the bore 22 to a point at a spaced distance from the nut 26 to form an intermediate chamber 29 with which the port 18 communicates.

The port 30 communicates from the chamber 13 to the atmosphere and is controlled by a check valve 31 movable in a bore 32 in the part 21. The valve 31 is normally held open by a spring 33. The tension of said spring 33 and the limit of movement of the valve 31 is controlled by an adjusting nut 34 threaded into the bore 32. Said nut has a square central hole 35 serving as a wrench seat and also as a port as will presently appear.

In practice the valve is connected into the brake equipment as follows: The valve casing is fastened to the car in any suitable manner but preferably by means of a bracket 36. A short nipple or pipe 37 then connects from the bottom of the triple valve casing carrying train line pressure to the chamber 5. A similar nipple or pipe 38 connects from the brake cylinder to the bore 32, while another nipple or pipe 39 connects from the triple valve exhaust port to the chamber 29.

In normal, inactive condition the valve appears as shown in the drawing. I will first proceed to describe the action thereof when retained brake pressure is to be had and later I will explain how brakes may be applied and retained pressure eliminated.

Describing now the operation for an application of the brakes for retained pressure, it is pointed out that with the valve in inactive position the train line pressure in the cylinder 1 is normally equalized on both sides of the piston 4 by reason of the equalizing groove 7. When the engineer desires retained brake pressure he moves his valve to make the usual reduction in the train line pressure. Then when he turns his valve to "release" position the exhaust from the triple valve passes through the pipe 39 into the chamber 29. Inasmuch as the valve 19 is normally closed the exhaust must therefore lift the plunger 24 to escape through the port 23. The retained pressure can therefore be fixed by the tension of the spring 25 which is normally, in railroading practice, fixed at fifteen pounds pressure to the square inch.

When the engineer made his reduction of train line pressure the pressure in the chamber 5 became less than that in the chamber 6. The greater pressure in the chamber 6 forced the piston 4 into said chamber 5 and opened the valve 9. Then the pressure in chamber 6 escaped through the equalizing port, 10—13—30, to the atmosphere, which escape occurred before the brake cylinder pressure reached the top of the valve 31, through the pipe 38, which pressure closed the said valve. When the release was made the train line pressure again entered and became equalized in the chambers 5 and 6 and closed the valve 9. For retained pressure these latter movements of the parts are of no moment as can be seen. When the release of the retained pressure is desired, however, then these latter parts play an important part as follows:—

To release the retained pressure the engineer makes another reduction of the train line pressure and returns valve to release. Again the pressure becomes unequal in the chambers 5 and 6, the piston 4 moves and opens the valve 9. The pressure moves from the chamber 6 through the port 10 into the chamber 13 where it is trapped by the valve 31 which is held closed under the retained pressure from the brake cylinder. As it is thus unable to escape to the atmosphere and the diameter of the cylinder 2 is less than the cylinder 1, this pressure acts on the piston 12. This moves the stem 16 into engagement with the stem 20 and opens the valve 19. The retained pressure thereupon moves from the brake cylinder through the triple valve, pipe 39, chamber 29 and port 18 to the atmosphere, whereupon all parts automatically return to normal inactive position, ready to be again called into action for obtaining retained brake pressure when desired.

It will be obvious from the above detailed description that to merely apply the brakes to check speed of train or to make a terminal test and to then proceed and not use retained brake, all that it is necessary for the engineer to do is to make a slight reduction, return to lap position and then make a further reduction which dual reduction will cause the parts to function as above and give the necessary braking without retaining the pressure. The automatic control of the retaining valve is thus demonstrated.

It is, of course, not possible to build up the retained air pressure above that fixed by the tension of the spring 25. However, in case of train speed picking up, and further retained brake being desired, a reduction is made, speed checked and then brakes released. Then another reduction is made and brake valve returned to "release" and retained pressure is in effect.

The advantages to be derived from the use of my automatic retaining valve may well be enumerated as follows:

A steady, uniform retained brake pressure may be retained throughout train line; the braking efficiency will be greatly enhanced as the valve is not subject to the defects found in present equipment; engineer can cool car wheels by taking advantage of flat spots on grades, thus tending to avoid the cracking of the wheels from overheating; the equipment is at all times under direct control of engineer, the advantage of which, over manually controlled valves, are obvious; eliminates the use of present retainers and long lengths of connecting pipe; will serve all the functions required at about half the present operating cost; can be readily inspected, and repaired or exchanged if found defective; release and set of same can be handled with train yard air; can be cheaply reconditioned by the renewal of piston rings and grinding of piston and valve seats.

A small cut out cock may be placed in the valve for opening communication from the retaining chamber 29 to the atmosphere which cock could be opened in level countries where retained pressure was not desired. This would render the valve inoperative and save the wear of parts.

Many wrecks are directly traceable to the present type of retaining valve, where the valves have been left closed either inadvertently, or have been closed maliciously, thus causing brakes to drag when not desired. My valve obviates any chances of this occurring.

With my improved valve each car will have its retained brake efficiency regardless of car or load. With the present equipment it often happens that many cars do not get their full retained pressure efficiency due to the difficulties sometimes experienced by the train man in reaching the valves to close same, such as crossing moving trains, etc.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A retaining valve for air brake equipment comprising a means for retaining the brake pressure in the brake cylinder, means controllable by the train line pressure for releasing the retained pressure, and means controlled by the retained pressure for causing the train line pressure to operate said releasing means.

2. A retaining means for air brake equipment comprising a valve to retain pressure in the brake cylinder, a relief port leading from the valve to allow the retained pressure to escape to the atmosphere, a valve normally closing said port, means for controlling the operation of the latter valve with the train line air pressure, and means for controlling such action of the train line pressure with the retained brake cylinder air pressure.

3. A retaining valve having a release port, a valve normally closing said port, means controlling the movement of the latter valve, such means including a reciprocating member, air pressure means for moving such reciprocating member into engagement with said valve to open same, and means whereby the retained air pressure will control the operation of such last named air pressure.

4. A retaining valve for air brake equipment and means where, upon one reduction and recharging of the train line pressure, the valve will retain brake cylinder pressure, and, upon a second reduction, the retained pressure will be released.

5. A pressure retaining valve for air brake equipment having a normally closed atmospheric relief port, and means for automatically opening said port upon a double reduction of the train line air pressure.

6. A pressure retaining valve for air brake equipment having a normally closed atmospheric relief port, a cylinder, a piston movable in the cylinder and adapted with its movement to control the opening of the relief port, means for applying air pressure to the cylinder to move the piston, and means automatically controlling the application of such air pressure with the pressure controlled by the retaining valve.

7. A pressure retaining valve for air brake equipment having an atmospheric relief port, a valve normally closing said port, a cylinder, a piston movable in the cylinder to engage the valve to open same, and means for operating the piston, such means being controlled by the train line air pressure and the retained pressure.

8. A pressure retaining valve for air brake equipment having an atmospheric relief port, a valve normally closing said port, a cylinder, a piston movable in the cylinder to engage the valve to open same, and means for operating the piston, such means including the train line air pressure, which in turn is controlled by the retained pressure.

9. A pressure retaining valve for air brake equipment having an atmospheric relief port, a valve normally closing said port, a cylinder, a piston movable in the cylinder to engage the valve to open same, another cylinder having a port communicating with the first cylinder, a piston in the second cylinder having a stem forming a valve for said port, the second cylinder having a pressure equalizing groove communicating from one side of its piston to the other when the latter is in normal position, the first cylinder having a port leading to the atmosphere, a pressure controllable valve in said last port, and means for admitting air pressure to said second cylinder.

10. A pressure retaining valve for air brake equipment, means for relieving the retained pressure by utilization of the train line pressure, and means controlled by the retained pressure to cause the train line pressure to function to operate the relief means.

In testimony whereof I affix my signature.

JOHN E. LONG.